(12) United States Patent
Haible

(10) Patent No.: US 12,459,472 B2
(45) Date of Patent: Nov. 4, 2025

(54) METHOD FOR CONTROLLING A PRESSURE GRADIENT OF A POWER BRAKE SYSTEM

(71) Applicant: Robert Bosch GmbH, Stuttgart (DE)

(72) Inventor: Timo Haible, Backnang (DE)

(73) Assignee: ROBERT BOSCH GMBH, Stuttgart (DE)

( * ) Notice: Subject to any disclaimer, the term of this patent is extended or adjusted under 35 U.S.C. 154(b) by 86 days.

(21) Appl. No.: 18/582,628

(22) Filed: Feb. 20, 2024

(65) Prior Publication Data
US 2024/0326762 A1  Oct. 3, 2024

(30) Foreign Application Priority Data

Mar. 30, 2023 (DE) ............... 10 2023 202 927.8

(51) Int. Cl.
| | | |
|---|---|---|
| *B60T 8/26* | (2006.01) | |
| *B60L 7/24* | (2006.01) | |
| *B60T 8/172* | (2006.01) | |

(52) U.S. Cl.
CPC ................. *B60T 8/26* (2013.01); *B60L 7/24* (2013.01); *B60T 8/172* (2013.01); *B60T 2270/604* (2013.01)

(58) Field of Classification Search
CPC .............. B60T 8/17; B60T 8/172; B60T 8/26
See application file for complete search history.

(56) References Cited

U.S. PATENT DOCUMENTS

| | | | | |
|---|---|---|---|---|
| 11,148,653 | B2* | 10/2021 | Foitzik ................. | B60T 13/686 |
| 2010/0332099 | A1* | 12/2010 | Kato ................. | B60T 8/17554 |
| | | | | 701/90 |
| 2011/0077834 | A1* | 3/2011 | Kudo .................... | B60T 8/1764 |
| | | | | 701/72 |
| 2013/0192937 | A1* | 8/2013 | Furuyama ............... | B60T 7/122 |
| | | | | 188/106 F |
| 2014/0350828 | A1* | 11/2014 | Heintze ................. | B60T 17/22 |
| | | | | 701/113 |
| 2016/0039398 | A1* | 2/2016 | Roll ....................... | B60T 8/326 |
| | | | | 303/15 |
| 2020/0010059 | A1* | 1/2020 | Busse ..................... | B60T 8/321 |
| 2020/0039492 | A1* | 2/2020 | Foitzik ................. | B60T 17/226 |
| 2023/0182699 | A1* | 6/2023 | Hara ........................ | B60L 7/26 |
| | | | | 701/71 |

FOREIGN PATENT DOCUMENTS

DE  102014200670 A1  7/2015

* cited by examiner

*Primary Examiner* — Long T Tran
(74) *Attorney, Agent, or Firm* — NORTON ROSE FULBRIGHT US LLP

(57) ABSTRACT

A method for controlling a maximum permissible pressure gradient of a power brake system of a motor vehicle. The method includes continuously calculating a maximum permissible pressure gradient, starting from a current motor speed gradient and motor speed of an external-force brake pressure generator, taking into account a predefined maximum permissible motor speed and a predefined maximum permissible motor speed gradient. In a next step, the maximum permissible pressure gradient is continuously transmitted to brake pressure demand units, so that, in the case of a braking event, the pressure gradient requested by the brake pressure demand units or resulting from a requested pressure is generally less than or equal to the maximum permissible pressure gradient.

7 Claims, 1 Drawing Sheet

METHOD FOR CONTROLLING A PRESSURE GRADIENT OF A POWER BRAKE SYSTEM

CROSS REFERENCE

The present application claims the benefit under 35 U.S.C. § 119 of German Patent Application No. DE 10 2023 202 927.8 filed on Mar. 30, 2023, which is expressly incorporated herein by reference in its entirety.

FIELD

The present invention relates to a method for controlling a maximum permissible pressure gradient of a power brake system of a motor vehicle. In addition, the present invention relates to a power brake system for carrying out such a method.

BACKGROUND INFORMATION

In a power brake system, the brake pressure is not usually generated via the brake pedal but via an power pressure generator. Accordingly, a path introduced via the brake pedal is measured, and an electric motor of the power pressure generator is controlled correspondingly to axially move a piston connected to a spindle drive unit in order to generate a pressure. In order to control the pressure, different parameters, such as rotational speed or number of revolutions, are set at the electric motor.

German Patent Application No. DE 10 2014 200 670 A1 describes a hydraulic vehicle brake system having two brake circuits, each of which comprises a pump having a pressure side and a suction side for setting a brake fluid pressure in at least one associated wheel brake. In addition, a connection device for the selective fluid-conducting connection and disconnection of the two brake circuits is disclosed. With the connection device, the two brake circuits are in each case optionally to be connected to one another on the pressure side of their relevant pump and disconnected.

SUMMARY

An object of the present invention is to provide a method for a power brake system with which a noise and vibration development of the power brake system can be reduced.

The object may be achieved by a method for controlling a maximum pressure gradient of a power brake system and by a power brake system. Preferred embodiments of the present invention are disclosed herein.

The present invention provides a method for controlling a maximum permissible pressure gradient of a power brake system of a motor vehicle. According to an example embodiment of the present invention, the method comprises the steps of continuously calculating a maximum permissible pressure gradient, starting from a current motor speed gradient and motor speed of an external-force brake pressure generator, taking into account a predefined maximum permissible motor speed and a predefined maximum permissible motor speed gradient.

A pressure gradient is understood to mean the change in pressure over time. Accordingly, the motor speed gradient is the change in the motor speed over time. The gradient can be not only positive but also negative. Since the pressure gradient is generated via the external-force brake pressure generator driven by the motor, the pressure gradient and the motor speed gradient are connected to one another. In other words, the pressure gradient also increases with a higher motor speed gradient. However, high motor speed gradients lead to high accelerations and thus also to vibrations, for which reason the motor speed gradient is limited to a maximum value, so that the vibrations thus remain below a range perceptible to the driver.

Motor speeds above a speed also lead to noise and vibrations, so that the motor speed is limited to a maximum motor speed. At this speed, the vibrations and noise are not perceptible by the driver. Starting from the current values of the motor, a maximum possible pressure gradient can be calculated taking into account the limit values. Although a higher pressure gradient would also be possible in principle, this is possible only by generating perceptible noise and vibrations.

In addition, according to an example embodiment of the present invention, the method comprises the step of continuously transmitting the maximum permissible pressure gradient to brake pressure demand units, so that, in the case of a braking event, the pressure gradient requested by the brake pressure demand units or resulting from a requested pressure is generally less than or equal to the maximum permissible pressure gradient.

Brake pressure demand units within the meaning of the present invention are understood to mean all driving functions which can trigger braking independently of a driver braking request. Such brake pressure demand units can be, for example, assistance systems, such as a distance assistant, congestion assistant or intersection assistant. Within the scope of their functions, these systems can carry out automated braking and for this purpose request a brake pressure from the external-force brake pressure generator. These brake pressure demand units request either a pressure or a pressure gradient. A pressure gradient can also be determined from the time in which this pressure is to be reached. Due to the continuous transmission of the maximum permissible pressure gradient, these brake pressure demand units do not usually request for braking a higher pressure gradient or pressure gradients resulting from the pressure. The development of noise and vibration can thereby be significantly reduced, since the relevant values for the motor speed gradient and of the motor speed remain below a range perceptible by the driver.

In a preferred embodiment of the present invention, in predefined braking situations of the brake pressure demand units, a pressure gradient or a pressure gradient resulting from the requested pressure is required which lies above the maximum pressure gradient. Here the predefined braking situations are specified in advance. These braking situations are critical braking maneuvers, such as emergency braking or the like. By defining such braking situations, it is thus possible nonetheless to request pressure gradients in emergency situations which lead to perceivable noise and vibrations, so that the safety of the motor vehicle remains ensured.

In a further preferred embodiment of the present invention, a brake fluid volume provided by the external-force brake pressure generator is used to brake a single axle. No brake fluid volume is thus provided for braking the remaining axle. As a result, more brake fluid volume is thus available for braking one axle, whereby the full braking force for this axle can be applied without the pressure gradient being greater than the maximum permissible pressure gradient. Although one axle can be braked with full braking force, the development of noise and vibration remains imperceptible to the driver.

According to an example embodiment of the present invention, a brake pressure at a rear axle and a front axle are preferably controlled independently of one another. Due to the independent control of the brake pressure at both axles, the axles can be braked in such a way that driving stability is thereby increased.

In an advantageous development of the present invention, an additional braking torque is applied by recuperation in order to reduce the pressure gradient. During recuperation, the motor vehicle does not brake via the mechanical brakes, but via an electric motor resistance. No brake fluid is thus required for this. A high braking torque can thereby be applied, and it is nevertheless possible to keep the noise and vibrations of the mechanical brake below a perceptible threshold.

Advantageously, according to an example embodiment of the present invention, one axle of the motor vehicle is braked entirely by recuperation. No brake fluid volume is thus required for this axle. The entire brake fluid volume can thus be used for the other axle. Here, too, it is possible to be able to apply a high braking torque, whereby noise and vibrations are still not perceptible.

In addition, the present invention relates to a power brake system for carrying out such a method. The power brake system comprises a comfort control unit in which a maximum permissible pressure gradient can be calculated, an external-force brake pressure generator, via which a pressure for vehicle brakes can be generated for braking the vehicle, and brake pressure demand units via which a pressure gradient or pressure can be transmitted to the external-force brake pressure generator for braking the vehicle. With such a power brake system, the advantages described are substantially achieved. In particular, the pressure requested by the brake pressure demand units is such that the maximum permissible pressure gradient is not exceeded, so that no noise and vibrations are perceptible by the driver.

Exemplary embodiments of the present invention are illustrated in the figures and explained in more detail in the following description.

DETAILED DESCRIPTION OF EXAMPLE EMBODIMENTS

Figure 1:
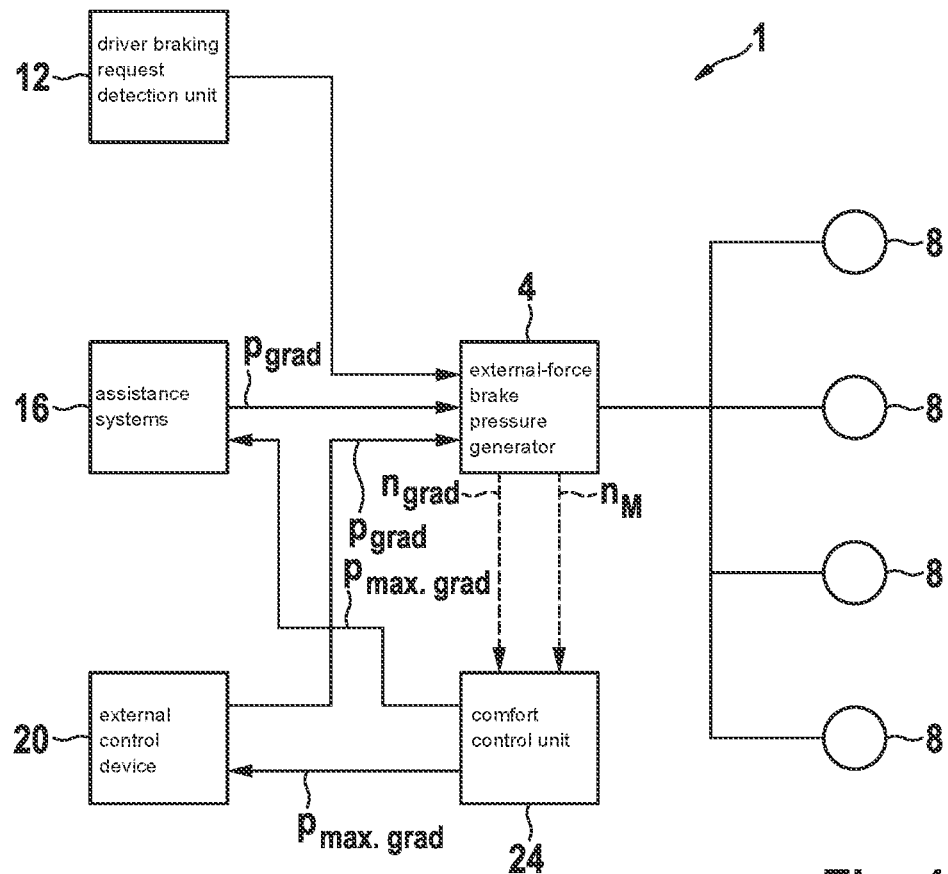
FIG. 1 shows an exemplary embodiment of a power brake system for carrying out method according to an example embodiment of the present invention.

FIG. 1 shows an exemplary embodiment of a power brake system 1 for carrying out the method according to the present invention. The power brake system 1 comprises an external-force brake pressure generator 4 which generates hydraulic brake pressure by means of which wheel brakes 8 of the power brake system 1 can be braked. In addition, a driver braking request detection unit 12 is provided, by means of which a braking request of the driver is detected and forwarded to the external-force brake pressure generator 4.

The power brake system 1 additionally comprises assistance systems 16 which represent a brake pressure demand unit, via which, independently of the driver braking request, a pressure gradient $p_{grad}$ is requested at the external-force brake pressure generator 4 in order to brake the motor vehicle. Although in this exemplary embodiment a pressure gradient is requested by the brake pressure demand units, it is also possible to request only a pressure which is to be reached in a specific time. In addition, a further brake pressure demand unit formed by an external control device 20 can be present, which requests from the external-force brake pressure generator 4 a pressure gradient $p_{grad}$.

In addition, the power brake system 1 comprises a comfort control unit 24, in which, starting from a current motor speed gradient $n_{grad}$ and the motor speed $n_M$ of the external-force brake pressure generator 4, while taking into account a maximum speed $n_{max}$ and a maximum speed gradient $n_{max.grad}$, a maximum permissible pressure gradient $p_{max.grad}$ can be calculated. This maximum permissible pressure gradient $p_{max.grad}$ is communicated continuously to each brake pressure demand unit 16, 20, so that the pressure gradient $p_{grad}$ requested by these units 16, 20 does not exceed this value. This ensures that the noise and vibrations generated by the external-force pressure generator 4 lie below a perceptible range.

Figure 2:
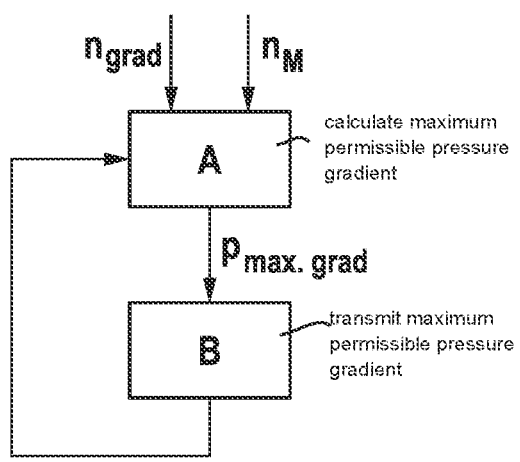
FIG. 2 shows an exemplary embodiment of a method for controlling a maximum permissible pressure gradient of a power brake system, according to an example embodiment of the present invention.

FIG. 2 shows an exemplary embodiment of a method for controlling a maximum permissible pressure gradient $p_{max.grad}$ of a power brake system 4. In a first method step A, starting from the current motor speed gradient $n_{grad}$ and the current speed $n_M$ of the external-force brake pressure generator 4, while taking into account a predefined maximum permissible motor speed $n_{max}$ and a maximum motor speed gradient $n_{max.grad}$, a maximum permissible pressure gradient $p_{max.grad}$ is calculated. In a second method step B, this maximum permissible pressure gradient $p_{max.grad}$ is transmitted to all brake pressure demand units 16, 20, so that, in the case of a braking event, the pressure gradient $p_{grad}$ requested by the brake pressure demand unit 16, 20 is generally smaller than or equal to the maximum permissible pressure gradient $p_{max.grad}$.

These steps are carried out continuously, so that for each current state of the external-force brake pressure generator 4 the maximum permissible pressure gradient $p_{max.grad}$ of the brake pressure demand units 16, 20 is known. Perceptible noise and vibrations can thereby be avoided.

What is claimed is:

1. A method for controlling a maximum permissible pressure gradient of a power brake system of a motor vehicle, the method comprising the following steps:
   continuously calculating a maximum permissible pressure gradient, starting from a current motor speed gradient and motor speed of an external-force brake pressure generator, taking into account a predefined maximum permissible motor speed and a predetermined maximum permissible motor speed gradient; and
   continuously transmitting the maximum permissible pressure gradient to brake pressure demand units so that, in the case of a braking event, a pressure gradient requested by the brake pressure demand units or resulting from a requested pressure is less than or equal to the maximum permissible pressure gradient.

2. The method according to claim 1, wherein, in predefined braking situations of the brake pressure demand units, a pressure gradient or a pressure gradient resulting from the requested pressure, is required which lies above the maximum pressure gradient.

3. The method according to claim 1, wherein a brake fluid volume provided by the external-force brake pressure generator is used to brake a single axle.

4. The method according to claim 1, wherein, a brake pressure at a rear axle and a brake pressure at a front axle are controlled independently of one another.

5. The method according to claim 1, wherein an additional braking torque is applied by recuperation to reduce the pressure gradient.

6. The method according to claim 1, wherein one axle of the motor vehicle is braked entirely by recuperation.

7. A power brake system, comprising:
- a comfort control unit configured to calculate a maximum permissible pressure gradient;
- an external-force brake pressure generator, via which a pressure for vehicle brakes can be generated for braking the vehicle; and
- brake pressure demand units via which, for braking the motor vehicle, a pressure gradient or pressure can be transmitted to the external-force brake pressure generator;

wherein the power brake system is configured to:
- continuously calculate a maximum permissible pressure gradient, starting from a current motor speed gradient and motor speed of the external-force brake pressure generator, taking into account a predefined maximum permissible motor speed and a predetermined maximum permissible motor speed gradient; and
- continuously transmit the maximum permissible pressure gradient to the brake pressure demand units so that, in the case of a braking event, a pressure gradient requested by the brake pressure demand units or resulting from a requested pressure is less than or equal to the maximum permissible pressure gradient.

* * * * *